United States Patent
Sergeev et al.

(10) Patent No.: US 8,014,410 B2
(45) Date of Patent: Sep. 6, 2011

(54) AUTOMATIC PACKET PROTECTION FORWARDING TO AN MPLS NETWORK BY A DUAL-HOMED ETHERNET BRIDGE

(75) Inventors: Andrei Sergeev, Kfar Saba (IL); David Berechya, Tel-mond (IL)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 240 days.

(21) Appl. No.: 12/299,582

(22) PCT Filed: Apr. 23, 2007

(86) PCT No.: PCT/EP2007/003527
§ 371 (c)(1),
(2), (4) Date: Nov. 4, 2008

(87) PCT Pub. No.: WO2007/128399
PCT Pub. Date: Nov. 15, 2007

(65) Prior Publication Data
US 2009/0175280 A1    Jul. 9, 2009

(30) Foreign Application Priority Data
May 4, 2006   (EP) .................... 06009216

(51) Int. Cl.
H04L 12/28 (2006.01)
H04L 12/56 (2006.01)
H04L 1/00 (2006.01)
H04L 12/26 (2006.01)

(52) U.S. Cl. ............... 370/401; 370/218; 370/395.31
(58) Field of Classification Search ............ 370/217, 370/218, 395.3, 395.31, 401
See application file for complete search history.

(56) References Cited

U.S. PATENT DOCUMENTS

| | | | |
|---|---|---|---|
| 6,032,194 | A | 2/2000 | Gai et al. |
| 2002/0172148 | A1 | 11/2002 | Kim et al. |
| 2003/0065815 | A1 | 4/2003 | Klink |
| 2003/0088698 | A1 | 5/2003 | Singh et al. |
| 2004/0151181 | A1 | 8/2004 | Chu et al. |
| 2004/0165600 | A1 | 8/2004 | Lee |
| 2006/0047851 | A1 | 3/2006 | Voit et al. |
| 2006/0072574 | A1 | 4/2006 | Akahane et al. |

FOREIGN PATENT DOCUMENTS

| | | |
|---|---|---|
| EP | 1 276 280 A | 1/2003 |
| EP | 1 549 001 A | 6/2005 |
| EP | 1 601 139 A | 11/2005 |
| WO | WO 2005/115099 A | 12/2005 |

OTHER PUBLICATIONS

Shinichi, A. et al., Apr. 6, 2006 EEE Computer Society: "Std. 802. 1Q-1998" ISBN 0-7381-1538-X, Mar. 8, 1999, XP002389169 New York, USA.

*Primary Examiner* — Ronald Abelson
(74) *Attorney, Agent, or Firm* — Laurence A. Greenberg; Werner H. Stemer; Ralph E. Locher

(57) ABSTRACT

A method and a system for forwarding Ethernet packets by an Ethernet bridge in an Ethernet Layer 2 VPN network is provided. The method includes: notifying the first Ethernet bridge about the primary internal port associated with the receiving MAC-address and to the given VLAN identification; notifying the first Ethernet bridge about the backup internal port directly associated with the backup MPLS port acting as a backup MPLS port in an event of failure of the primary MPLS port; and, if the corresponding primary MPLS port has failed, forwarding Ethernet packets to the backup egress port of the receiving MAC-address having the given VLAN identification.

7 Claims, 3 Drawing Sheets

| MAC-address | VID | Egress port |
|---|---|---|
| MACa | 1 | 1 |
| MACb | 1 | 4 |

FIG. 2 (PRIOR ART)

| VID | PW-ID | Tunnel-ID |
|---|---|---|
| 1 | 10 | 100 |

FIG. 3 (PRIOR ART)

| Tunnel-ID | Primary egress port | Backup egress port |
|---|---|---|
| 100 | 4 | 5 |

FIG. 4 (PRIOR ART)

| MAC-address | VID | Primary egress port | Backup egress port |
|---|---|---|---|
| MACa | 1 | 1 | - |
| MACb | 1 | 4 | 5 |

FIG. 5

| MPLS port | Status |
|---|---|
| 4m | Failed |
| 5m | OK |

FIG. 6

AUTOMATIC PACKET PROTECTION FORWARDING TO AN MPLS NETWORK BY A DUAL-HOMED ETHERNET BRIDGE

CLAIM FOR PRIORITY

This application is a national stage application of PCT/EP2007/003527, filed Apr. 23, 2007, which claims the benefit of priority to European Application No. 06009216.0, filed May 4, 2006, the contents of which hereby incorporated by reference.

TECHNICAL FIELD OF THE INVENTION

The present invention relates to a system and method of automatic packet protection forwarding to an MPLS network by a dual-homed Ethernet bridge.

BACKGROUND OF THE INVENTION

Virtual Private Networks (VPNs) are generally referred to as to the use of public or private networks to create groups of users that are separated from other network users and that may communicate among them as if they were on a private network.

Ethernet is the most widely used frame-based computer networking technology for LANs and it is used to provide point to point or multipoint to multipoint communications among users that are in the same location.

In recent years, service providers are offering, through packet switched networks, Ethernet Layer 2 VPNs (L2VPNs) which enable enterprise customers, having branches in different locations, to connect their different branches via such Ethernet L2VPNs. Examples of Ethernet L2VPNs are Virtual Private LAN Services (VPLS) and Ethernet Virtual Private Wire Services (VPWS).

As defined by document RFC4026 [1], a VPLS is a provider provisioned service that emulates the full functionality of a traditional LAN. The VPLS makes it possible to interconnect several LAN segments over a PSN and makes the remote LAN segments behave as one single LAN. In the VPLS, the provider network emulates a learning bridge, and forwarding decisions are taken based on MAC addresses or MAC addresses and VLAN tag.

A VPWS is a point-to-point circuit or link connecting two customer edge (CE) devices. The link is established as a logical link through a public switched network.

The above mentioned CE devices may be routers, bridges, switches or hosts. The CE device in a customer network is connected to a provider edge (PE) device in a provider network via an attachment circuit. An attachment circuit is either a physical or a logical circuit attaching the CE device to the PE device in a L2VPNs. An example of attachment circuit is a VLAN. The PE device is the device or the set of devices at the edge of the provider network with the functionality that is needed to interface with the CE device. In OSI Layer 2, the PE devices in the core network are connected via pseudo-wires. A pseudo-wire is an emulated point-to-point connection over a public switched network that allows the interconnection of two nodes with any Layer 2 technology. Thus, the pseudo-wires are building blocks of provider provisioned VPLS/Ethernet VPWS technologies.

Both VPLS and Ethernet VPWS are OSI Layer 2 services typically provided over MPLS networks. A MPLS network is a packet switched network built of MPLS nodes. Examples of MPLS nodes are Label Edge Routers (LERs) and Label Switching Routers (LSRs). The LER or MPLS LER is a router that sits at the boundary between the MPLS domain and an Ethernet/IP network. The context of the present invention relates to L2VPNs, which are provider provisioned VPNs of OSI Layer 2 type, thus, in this context, the Ethernet network boundary and not the IP boundary is taken into consideration.

Ethernet traffic is presented to an ingress LER, labels are pushed, and the resultant packets are forwarded over a MPLS tunnel made of one or more Lable Switched Paths. At the egress edge of the MPLS domain, another LER, an egress LER, removes all the MPLS encoding data, performs a normal Ethernet MAC lookup, and forwards the packet into the Ethernet network.

The above mentioned MPLS tunnel is the connectivity through the MPLS network that is used to send packet traffic across the MPLS network from one PE device to another.

FIG. 1 shows a block diagram of an example of Ethernet VPWS architecture in an Ethernet Layer 2 VPN network. A transmitting CE device CEa having a first MAC address MACa is transmitting packets directed to a receiving CE device CEb having a receiving MAC address MACb. To a CE device is associated at least one MAC address. In case, CE is a switch a plurality of MAC-addresses may be associated to it. The first CE device CEa is connected to a first PE device PE1 and the second CE device CEb is connected to a second PE device PE2. The two PE devices PE1, PE2 comprise, respectively, a first and a second Ethernet/MAC bridges EB1, EB2 and an ingress MPLS LER ML1 and an egress MPLS LER ML2.

The first Ethernet bridge EB1 includes a plurality of Ethernet ports 1,2,3,4,5. Such plurality of Ethernet ports 1, 2, 3, 4, 5 include at least one external port 1, 2, 3 connected to at least one CE device CEa, and at least two external Ethernet ports 4, 5 connected to the ingress LER ML1. MPLS ports 4m, 5m of the ingress LER ML1 are directly associated to the external bridge ports 4,5 and are connect the ingress LER ML1 to the MPLS network. A primary ingress MPLS tunnel Tpr and a backup ingress MPLS tunnel Tbk are departing from the at least two MPLS ports 4m, 5m and are connecting the ingress and egress LERs ML1, ML2 through the MPLS network. The ingress and egress LERs ML1, ML2 are each comprising a module for managing Ethernet L2VPN services VxI, Vx2. The L2VPN modules VxI, Vx2 may be modules for managing Ethernet VPWS services only or may be modules for managing both Ethernet VPWS and VPLS services. If a VPLS architecture is provided, the L2VPN modules VxI, Vx2 may be modules for managing VPLS services only. The transmitting CE device CEa is transmitting Ethernet packets of a given VLAN identification (VID) directed to the receiving MAC-address MACb of the receiving CE device CEb.

As known in prior art L2VPN systems, the first MAC bridge EB1 attempts to forward such Ethernet packets towards their destination device by querying its internal filtering database or its Forwarding Information Base (FIB). The FIB, as defined IEEE 802. Iq standard [2], is a table containing the information necessary for a MAC bridge to forward Ethernet packets. The FIB typically contains destination MAC address, VID and ingress port. The FIB supports queries by the forwarding process of the MAC/Ethernet bridge to where frames, received with given values of destination MAC-address parameter and VID, are to be forwarded through a given potential transmission port.

FIG. 2 shows an example of a prior art FIB, typically located in the first Ethernet bridge EB1, for the example architecture of FIG. 1.

As shown in the prior art FIB example of Table 1, Ethernet packets with a given VID 1 and directed to MAC-address MACa are to be forwarded, by the first Ethernet bridge EB1, to the egress port 1. Instead, Ethernet packets with the same given VID 1 and directed to MAC-address MACb are to be forwarded, by the first Ethernet bridge EB1, to the egress port 4.

As known in prior art L2VPN systems, another table, a pseudo-wire table, is located in the L2VPN module VxI of the ingress LER ML1 in order to perform the Ethernet VPWS and/or VPLS functions. The pseudo-wire table associates the VLAN-ID to corresponding pseudo-wire and MPLS tunnel, providing an attachment circuit to the pseudo-wire.

FIG. 3 shows an example of PW table for FIG. 1 in which a VLAN with VID 1 is associated to a pseudo-wire with PW-IE 10 and to a MPLS tunnel with Tunnel-ID 100.

As known in prior art L2VPN systems, a further table, a tunnel forwarding table, is located in the ingress LER ML1 and associates the Tunnel-ID with primary and back-up egress ports.

As shown in the tunnel forwarding table example of FIG. 4, the ingress LER ML1 knows that the MPLS tunnel having Tunnel-ID 100, is to be associated, in normal conditions, to primary-egress port 4 and that, in case of a port failure, backup egress port 5 is to be used instead.

In known prior art methods of providing Ethernet VPWS and VPLS services, the first MAC bridge EB1 learns the MAC-addresses from the external Ethernet ports 1, 2, 3 and updates its FIB accordingly, e.g. the first row of FIG. 2.

As regards the bridge internal ports 4, 5, it is the L2VPN module VxI inside the ingress LER ML1 that informs, via a bridge control module BC, the first MAC bridge EB1, about the egress port for the MAC-address MACb to be used, upon receiving packets from the relevant pseudo-wire. Hence, in prior art methods, the Ethernet bridge EB1 is notified about the association of MAC-addresses MACb to internal Ethernet ports 4 directly associated to the MPLS ports 4m of the ingress LER ML1 and it stores this information in an update FIB table, e.g. second row of FIG. 2.

As above explained, in prior art methods, in case of normal operations, the first Ethernet Bridge is capable of forwarding Ethernet packets according to destination MAC-address MAca, MACb by using its updated FIB table. However, in prior art methods, problems occurs when a MPLS port 4 fails since the Ethernet bridge EB1 is unaware of the presence of a MPLS port failure and of the presence of a possible backup egress port 5.

Typically in known methods of providing Ethernet VPWS and VPLS services, in case of failure of the primary ingress MPLS port 4m, the ingress LER ML1 notifies, via the control bridge module BC, the first MAC bridge EB1 to flush all the MAC-addresses associated to the internal port 4 directly associated to the failed MPLS port 4m. Then, the Ethernet bridge EB1 has to update the FIB timely. Only on a later step, the Ethernet bridge EB1 is notified, by the ingress LER ML1, that the MAC-addresses MACb previously associated to the internal port 4 are re-assigned to a backup internal port 5, directly associated to the backup MPLS port 5m. In fact, the ingress LER ML1 notifies the bridge EB1, about the new association, only if and when new Ethernet packets are received from the relevant pseudo-wire. Again, the Ethernet bridge EB1 has to update the FIB timely and, only then, after a consistent delay, traffic may thus be protected via an alternative backup MPLS port 5m.

In the meanwhile, in the intermediate state in which the old forwarding entry is flushed and a new one is not entered yet, it is typically performed the flooding of packets towards all possible destination ports. The major drawback of known prior art methods of forwarding Ethernet packets in Ethernet VPWS and VPLS services, is that in the event of MPLS port failure, protection switching is not fast enough to guarantee traffic with minimal packet loss, also in case of traffic having a high priority traffic class. In fact, in known methods of protection switching of Ethernet packets in Ethernet VPWS and VPLS services, a consistent amount of Ethernet packets are lost, in case of MPLS port failure, because they are forwarded towards a failed port, at the time interval between the failure and the updating of the internal filtering information database.

Moreover, in known methods of protection switching of Ethernet packets in Ethernet VPWS and VPLS services, flooded packet, being best effort based, are the first to be discarded, in case of congestion, in favor of higher priority traffic packets.

SUMMARY OF THE INVENTION

The present invention provides a system and method that minimize packet loss during protection switching of a failed MPLS port.

In one embodiment of the invention, there is a method and a system for forwarding Ethernet packets by an Ethernet bridge (EB1) in an Ethernet Layer 2 VPN network; the Ethernet Layer 2 VPN network connecting at least two customer edge devices, herein-after referred to as CE devices, having their own MAC addresses; the at least two CE devices comprising at least one transmitting CE device and at least one receiving device in communication with each other via a MPLS network; the MPLS network comprising, at its boundary, an ingress Label Edge Router and an egress MPLS Label Edge Router, herein-after referred to as LERs, each comprising a module for managing Ethernet Layer 2 VPN services, hereinafter referred as L2VPN module; the ingress and egress LERs (ML1, ML2) being respectively connected to said transmitting and receiving CE devices via a first Ethernet bridge and a second Ethernet bridge; the first bridge comprising an internal filtering databases containing the association of MAC-address to primary egress internal port and to given VLAN identification; the first bridge having Ethernet ports comprising at least one external port and at least two internal ports; the at least one external ports being connected to the transmitting CE device and the at least two internal ports being connected to the ingress; the ingress LER having at least two MPLS ports, interfacing the MPLS network, respectively directly associated to the at least two internal ports of the first Ethernet bridge; from the at least two MPLS ports, a primary MPLS tunnel and a backup MPLS tunnel are connecting the ingress LER to the egress LER, through a primary and a backup MPLS ports respectively; the invention comprising:

a) by the L2VPN module of the ingress LER, notifying the first Ethernet bridge about the primary internal port associated to the receiving MAC-address and to the given VLAN identification; b) by the L2VPN module of the ingress LER, notifying the first Ethernet bridge about the backup internal port directly associated to the backup MPLS port which is acting as a backup MPLS port in an event of failure of the primary MPLS port; c) by the first Ethernet bridge, adding to the internal filtering database the backup internal port to be used in the event of failure of the primary MPLS port so as to create a combined filtering database; d) by the L2VPN module of the ingress LER, notifying the first Ethernet bridge about MPLS ports status; e) by the at least one transmitting CE device, transmitting Ethernet packets of a given VLAN identification to the receiving MAC-address of the at least one receiving CE device; f) by the first Ethernet bridge, before forwarding the transmitted Ethernet packets, checking, when, in the combined filtering database, the receiving MAC-address of the given VLAN is associated to a backup ingress internal port, if the corresponding primary MPLS port directly associated to said primary ingress internal port is failed or not; g) if the corresponding primary MPLS port is failed, forwarding Ethernet packets to the backup egress port of the receiving MAC-address having the given VLAN identification.

In another embodiment of the invention,
h) if the corresponding primary MPLS port is not failed, forwarding Ethernet packets to the primary egress port of the receiving MAC-address having the given VLAN identification.

The invention may also include, in another embodiment: i) if the corresponding primary MPLS port is not failed, checking the status of the locking protection bit:
if the status of the locking protection bit is unlocked, forwarding Ethernet packets to the primary egress port; otherwise if the status of the locking protection bit is locked, forwarding Ethernet packets to the backup egress port.

In another embodiment of invention, the Ethernet Layer 2 VPN services may be selected from the group consisting of:
Virtual Private LAN Services;
Ethernet Virtual Private Wire Services;
Virtual Private LAN Services and Ethernet Virtual Private Wire Services.

In still another embodiment of the invention, the MPLS port status is stored may be conveniently stored in a MPLS ports status table within the first Ethernet bridge.

The invention allows fast protection switching since the flushing of MAC-addresses associated to failed port is not required. In fact, the Ethernet bridge is pre-informed about the alternative backup port to be used in case of MPLS port failure and such information is stored in the combined filtering database.

The invention also allows QoS improvements. In fact, in case of port failure, Ethernet packets, being not flooded, are forwarded according to their traffic class and are not dropped in favor of less-priority traffic.

BRIEF DESCRIPTION OF THE DRAWINGS

The invention will now be described with reference to the accompanying drawing,
FIG. 2 shows an example of a prior art FIB, typically located in the first Ethernet bridge EB1, for the example architecture of FIG. 1;
FIG. 3 shows an example of PW table for FIG. 1 in which a VLAN with VID 1 is associated to a pseudo-wire with PW-IE 10 and to a MPLS tunnel with Tunnel-ID 100;
FIG. 4 is an example of a known tunnel forwarding table;
FIG. 5 shows an example of combined filtering database for the block diagram of FIG. 1, according to an embodiment of the present invention;
and
FIG. 6 shows an example of an MPLS port status table for the architecture example of FIG. 1.

DETAILED DESCRIPTION OF THE INVENTION

Figure 1:
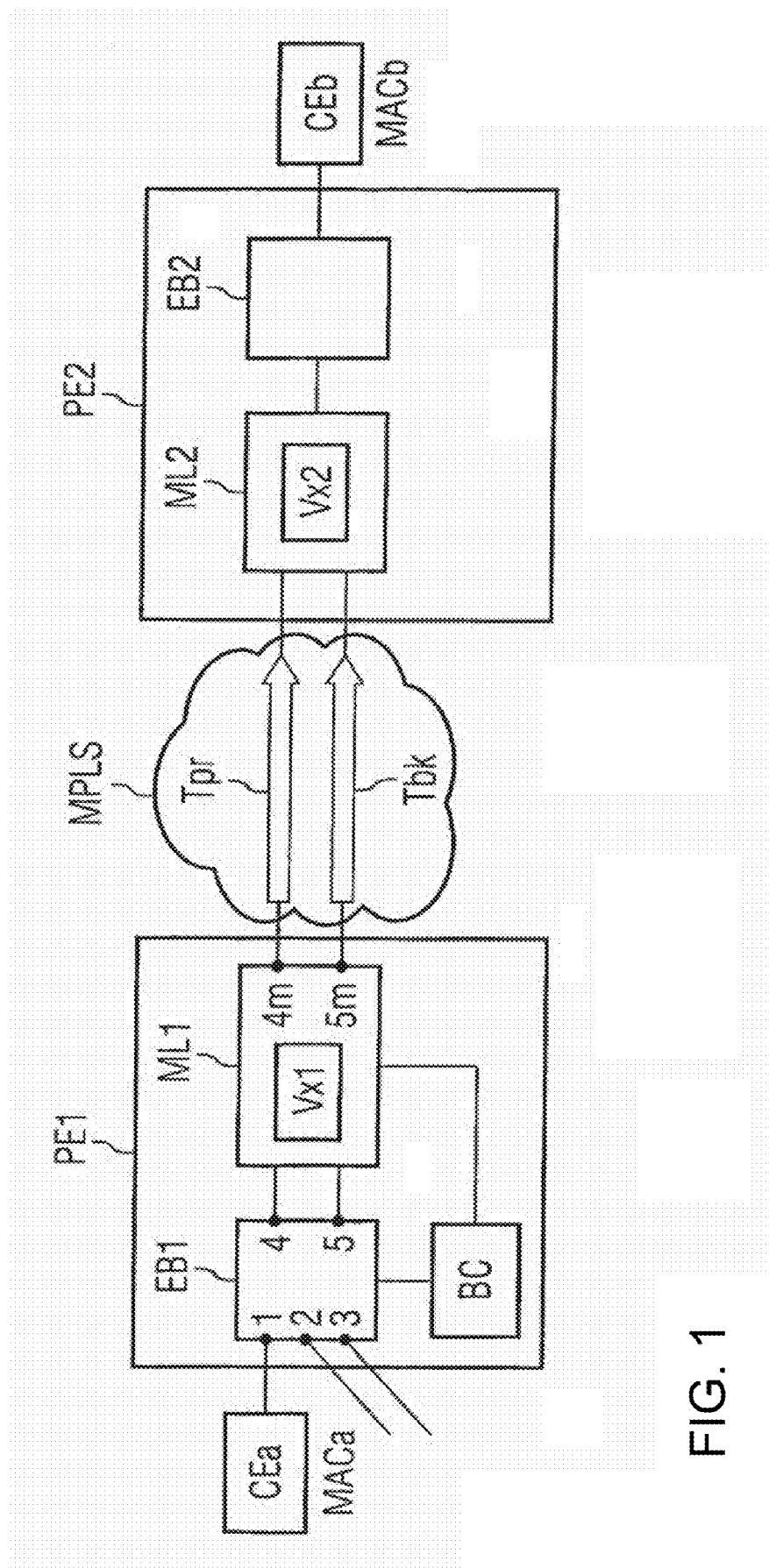
FIG. 1 is a block diagram of an example of Ethernet VPWS architecture.

In the first Ethernet bridge EB1, the internal filtering database of prior art systems, e.g. FIG. 2, is modified, according to an embodiment of the present invention, so as to produce a combined filtering database including additional information about the bridge backup egress port 5 to be used in case of failure of the MPLS port 4m. The bridge backup egress port 5 is directly associated to the backup MPLS port 5m. FIG. 5 shows an example of combined filtering database for the block diagram of FIG. 1. The update of the combined filtering database is performed by the Ethernet bridge EB1 when it receives a notification from the L2VPN module VxI of the ingress LER ML1 containing information about the backup egress port 5. The first MAC bridge EB1 attempts to forward received Ethernet packets towards their destination devices CEb by querying its combined filtering database.

Prior art tables, pseudo-wire table located in the L2VPN module VxI (e.g. FIG. 3) and tunnel forwarding table located in the ingress LER ML1 (e.g. FIG. 4), remain unchanged.

Similarly as in prior art Ethernet VPWS/VPLS systems, the first MAC bridge EB1 learns the MAC-addresses MACa from the external Ethernet ports 1, 2, 3 and updates its combined filtering database accordingly, e.g. the first row of FIG. 5.

As regards the bridge internal ports 4, 5, it is the L2VPN module VxI inside the ingress LER ML1 that informs, via a bridge control module BC, the first MAC bridge EB1, about the primary egress port for the receiving MAC-address MACb to be used, upon receiving packets from the relevant pseudo-wire. Hence, the Ethernet bridge EB1 is notified about the association of MAC-addresses MACb to internal primary ports 4 directly associated to the primary MPLS ports 4m of the ingress LER ML1 and it stores this information in the update combined filtering database, e.g. second row of FIG. 5.

Differently from prior art systems, the L2VPN module VxI inside the ingress LER ML1 informs the first MAC bridge EB1 also about the backup egress port 5 for the receiving MAC-address MACb to be used in case of failure of the primary MPLS port 4m of the ingress LER ML1.

Moreover, the L2VPN module VxI inside the ingress LER ML1 also notifies the bridge EB1 about the status of the MPLS ports 4m, 5m. In the even of failure of a MPLS port 4m, the L2VPN module VxI notifies the bridge EB1 in a fast way via interrupt and the MPLS port failure event is immediately propagated to the Ethernet bridge EB1.

The Ethernet bridge EB1 stores the received information about the status of the MPLS ports, in a MPLS port status table located in the Ethernet bridge EB1. The combined filtering database, in the event of MPLS port failure, does not need to be updated since the information about the backup port 5 to be used is already present in it.

FIG. 6 shows an example of an MPLS port status table for the architecture example of FIG. 1.

When the Ethernet bridge EB1 receives Ethernet packets directed to a specific receiving MAC-address MACb and a given VID, e.g. MACb and VID 1, the Ethernet bridge queries the combined filtering database, e.g. second row of FIG. 5, and, when a alternative backup port 5 is assigned to the corresponding record, the Ethernet bridge EB1 checks first, in the MPLS status table, the MPLS port status of the corresponding record (e.g. first row of FIG. 6).

The MPLS port status check is performed by the Ethernet bridge in a fast way by checking the relevant bit status of the port before performing packet forwarding.

In case the status of the corresponding MPLS port 4m is OK (not failed), the Ethernet bridge EB1 uses from the combined filtering database the primary egress port 4 associated to the given received MAC-address MACb and the given VID and performs normal forwarding of the Ethernet packets to the primary egress port 4.

In case the status of the corresponding MPLS port is failed, the Ethernet bridge EB1 knows immediately, by querying the combined filtering database, the backup egress port 5 to be used to forward the packets directed to the received MAC-address MACb with the given VID. The actual forwarding is done towards the backup port 5. Advantageously, no flushing and flooding is required, thus minimizing the packet loss due to port MPLS failures.

When the previously failed MPLS port 4 is recovered, a return to normal bridge forwarding, towards the primary egress port 5, is achieved by the simple fast notification, by the L2VPN module VxI, of the return to status OK of the previously failed MPLS port 4m.

In a further embodiment of the present invention, a non-revertive mode may be implemented. In the non-revertive mode, when the status of the MPLS port 4m is failed, the status of an protection locking is set to locked in order to lock the forwarding of traffic towards the backup MPLS port 5m, even when the primary MPLS port 4m is restored. The status of the protection locking bit may be reset to unlocked only by the operator and, only when the status is unlocked, the forwarding to the primary egress port 4 may take place. Every time the status of the primary MPLS port 4m is found to be OK and the protection locking bit status is locked, in the non-revertive mode, Ethernet packets are forwarded to the backup egress port 5. Normal forwarding to the primary egress port 4 takes place only when the status of the primary MPLS port 4m is OK and the protection locking bit status is unlocked.

As above explained, FIG. 1 represents a block diagram of an example of Ethernet VPWS architecture. The skilled in the art would recognize that the scope of this invention is not limited to the specific point to point Ethernet VPWS architecture of FIG. 1, which allows only point-to-point Layer 2 tunnels.

In fact, the present invention may be also implemented in VPLS architectures allowing a fall mesh of sites of any-to-any multipoint connectivity. In case of multipoint to multipoint architecture, there may be one ingress LER and one and more egress LERs and from each MPLS port of an egress LERs may depart more than one egress MPLS tunnels.

In general, the skilled in the art would know that the MPLS tunnels are unidirectional connectivity and that each MPLS tunnel may aggregate one or more MPLS pseudo-wires. Moreover, since an ingress LER is defined as being the LER at the ingress of the MPLS network, also the other LER denoted as ML2 (in FIG. 1) may be viewed as an ingress LER for the opposite transmission direction and the teachings of the present invention may also be applied to this latter LER as well.

Although a preferred embodiment of this invention has been disclosed, the skill in the art would recognize that certain modifications would come within the scope of this invention. For that reason, the following claims should be studied to determine the true scope and content of this invention.

The invention claimed is:

1. A method for forwarding Ethernet packets by an Ethernet bridge in an Ethernet Layer 2 VPN network, comprising:
   connecting at least two customer edge devices (CE devices) having respective MAC addresses, wherein
      at least two CE devices comprise at least one transmitting CE device and at least one receiving device in communication with each other via a MPLS network,
      the MPLS network comprising, at its boundary, an ingress Label Edge Router and an egress MPLS Label Edge Router (LERs), each comprising a module for managing Ethernet Layer 2 VPN services (L2VPN module),
      the ingress and egress LERs respectively connected to the transmitting and receiving CE devices via a first Ethernet bridge and a second Ethernet bridge,
      the first bridge comprising an internal filtering databases including the association of MAC-address to primary egress internal port and to given VLAN identification,
      the first bridge having Ethernet ports comprising at least one external port and at least two internal ports, the at least one external ports connected to the transmitting CE device and the at least two internal ports connected to the ingress LER,
      the ingress LER having at least two MPLS ports, interfacing the MPLS network, respectively directly associated to the at least two internal ports of the first Ethernet bridge, and
      from the at least two MPLS ports, a primary MPLS tunnel and a backup MPLS tunnel are connecting the ingress LER to the egress LER, through a primary and a backup MPLS ports respectively; and
   notifying, by the L2VPN module of the ingress LER, the first Ethernet bridge about the primary internal port associated to the receiving MAC-address and to the VLAN identification;
   notifying, by the L2VPN module of the ingress LER, the first Ethernet bridge about the backup internal port (5) directly associated to the backup MPLS port which is acting as a backup MPLS port in an event of failure of the primary MPLS port;
   adding, by the first Ethernet bridge, to the internal filtering database the backup internal port to be used in the event of failure of the primary MPLS port to create a combined filtering database;
   notifying, by the L2VPN module of the ingress LER, the first Ethernet bridge about MPLS ports status;
   transmitting, by the at least one transmitting CE device, transmitting Ethernet packets of a given VLAN identification to the receiving MAC-address of the at least one receiving CE device;
   checking, by the first Ethernet bridge, before forwarding the transmitted Ethernet packets, when, in the combined filtering database, the receiving MAC-address of the given VLAN is associated to a backup ingress internal port, if the corresponding primary MPLS port directly associated to the primary ingress internal port is failed; and
   if the corresponding primary MPLS port is failed, forwarding Ethernet packets to the backup egress port of the receiving MAC-address having the VLAN identification.

2. The method according to claim 1, further comprising:
   if the corresponding primary MPLS port is not failed, forwarding Ethernet packets to the primary egress port of the receiving MAC-address having the VLAN identification.

3. The method according to claim 1, further comprising:
   if the corresponding primary MPLS port is not failed, checking the status of the locking protection bit:
      if the status of the locking protection bit is unlocked, forwarding Ethernet packets to the primary egress port, otherwise
      if the status of the locking protection bit is locked, forwarding Ethernet packets to the backup egress port.

4. The method according to claim 1, wherein notifying the first Ethernet bridge about the primary internal port associated to the receiving MAC-address and to the VLAN identification; notifying the first Ethernet bridge about the backup internal port directly associated to the backup MPLS port which is acting as a backup MPLS port in an event of failure of the primary MPLS port; and adding to the internal filtering database the backup internal port to be used in the event of failure of the primary MPLS port so as to create a combined filtering database;
are performed via a bridge control module.

5. The method according to claim 1, wherein the Ethernet Layer 2 VPN services are selected from the group consisting of:
Virtual Private LAN Services;
Ethernet Virtual Private Wire Services;
Virtual Private LAN Services and Ethernet Virtual Private Wire Services.

6. The method according to claim 1, wherein the MPLS port status is stored in a MPLS ports status table within the first Ethernet bridge.

7. A system having means for performing a method for forwarding Ethernet packets by an Ethernet bridge in an Ethernet Layer 2 VPN network, comprising:
connecting at least two customer edge devices (CE devices) having respective MAC addresses, wherein
at least two CE devices comprise at least one transmitting CE device and at least one receiving device in communication with each other via a MPLS network,
the MPLS network comprising, at its boundary, an ingress Label Edge Router and an egress MPLS Label Edge Router (LERs), each comprising a module for managing Ethernet Layer 2 VPN services (L2VPN module),
the ingress and egress LERs respectively connected to the transmitting and receiving CE devices via a first Ethernet bridge and a second Ethernet bridge,
the first bridge comprising an internal filtering databases including the association of MAC-address to primary egress internal port and to given VLAN identification,
the first bridge having Ethernet ports comprising at least one external port and at least two internal ports, the at least one external port connected to the transmitting CE device and the at least two internal ports connected to the ingress LER,
the ingress LER having at least two MPLS ports, interfacing the MPLS network, respectively directly associated to the at least two internal ports of the first Ethernet bridge, and
from the at least two MPLS ports, a primary MPLS tunnel and a backup MPLS tunnel are connecting the ingress LER to the egress LER, through a primary and a backup MPLS ports respectively; and
notifying, by the L2VPN module of the ingress LER, the first Ethernet bridge about the primary internal port associated to the receiving MAC-address and to the given VLAN identification;
notifying, by the L2VPN module of the ingress LER, the first Ethernet bridge about the backup internal port directly associated to the backup MPLS port which is acting as a backup MPLS port in an event of failure of the primary MPLS port;
adding, by the first Ethernet bridge, to the internal filtering database the backup internal port to be used in the event of failure of the primary MPLS port so as to create a combined filtering database;
notifying, by the L2VPN module of the ingress LER, the first Ethernet bridge about MPLS ports status;
transmitting, by the at least one transmitting CE device, transmitting Ethernet packets of a given VLAN identification to the receiving MAC-address of the at least one receiving CE device;
checking, by the first Ethernet bridge, before forwarding the transmitted Ethernet packets, when, in the combined filtering database, the receiving MAC-address of the given VLAN is associated to a backup ingress internal port, if the corresponding primary MPLS port directly associated to the primary ingress internal port is failed; and
if the corresponding primary MPLS port is failed, forwarding Ethernet packets to the backup egress port of the receiving MAC-address having the VLAN identification.

* * * * *